US010740372B2

(12) United States Patent
Matsumoto

(10) Patent No.: US 10,740,372 B2
(45) Date of Patent: Aug. 11, 2020

(54) SYSTEM AND METHOD FOR EXTRACTING DATA FROM A NON-STRUCTURED DOCUMENT

(71) Applicants: Canon Information and Imaging Solutions, Inc., Melville, NY (US); Canon U.S.A., Inc., Melville, NY (US)

(72) Inventor: Hideaki Matsumoto, Port Washington, NY (US)

(73) Assignees: Canon Information and Imaging Solutions, Inc., Melville, NY (US); Canon U.S.A., Inc., Melville, NY (US)

(*) Notice: Subject to any disclaimer, the term of this patent is extended or adjusted under 35 U.S.C. 154(b) by 1170 days.

(21) Appl. No.: 15/085,781

(22) Filed: Mar. 30, 2016

(65) Prior Publication Data
US 2016/0292262 A1 Oct. 6, 2016

Related U.S. Application Data

(60) Provisional application No. 62/142,368, filed on Apr. 2, 2015.

(51) Int. Cl.
G06F 16/00 (2019.01)
G06F 16/33 (2019.01)
(Continued)

(52) U.S. Cl.
CPC ............ *G06F 16/334* (2019.01); *G06F 16/93* (2019.01); *G06K 9/00449* (2013.01); *G06K 9/00463* (2013.01); *G06K 9/18* (2013.01); *H04W 4/08* (2013.01); *H04W 12/04* (2013.01); *H04W 12/08* (2013.01); *H04W 12/06* (2013.01)

(58) Field of Classification Search
CPC .... G06F 17/21; G06F 16/334; G06F 16/9535; G06F 21/6218; G06F 21/6254; G06F 16/93; G06K 2209/01; G06K 9/00442; G06K 9/00463; G06K 9/00483; G06K 9/00469
See application file for complete search history.

(56) References Cited

U.S. PATENT DOCUMENTS 6,360,011 B1* 3/2002 Katsumata ......... G06K 9/00449
382/181
7,773,808 B2* 8/2010 Lim .................. G06K 9/033
382/181
(Continued)

*Primary Examiner* — Merilyn P Nguyen
(74) *Attorney, Agent, or Firm* — Canon U.S.A., Inc., IP Division

(57) ABSTRACT

A data object representing an electronic document having a plurality of data items each having at least one data value associated therewith is loaded from memory. The data object is searched for plurality of data items by keyword search for at least one candidate target data item. A target data item is selected by identifying at least one ancillary data item known to be located within the electronic document proximate to the at least one candidate. A target field within the electronic document is generated to encapsulate the at least one data value associated with the selected target data item. A format of the at least one data value is compared with a predetermined data value format and extracted from the target field in response to the format of the at least one data value matching the predetermined data value format for storage in a table of a database.

12 Claims, 13 Drawing Sheets

(51) Int. Cl.
  *G06K 9/18* (2006.01)
  *G06F 16/93* (2019.01)
  *G06K 9/00* (2006.01)
  *H04W 4/08* (2009.01)
  *H04W 12/04* (2009.01)
  *H04W 12/08* (2009.01)
  *H04W 12/06* (2009.01)

(56) References Cited

U.S. PATENT DOCUMENTS

| | | | | |
|---|---|---|---|---|
| 8,996,350 B1* | 3/2015 | Dub | | G06F 16/285 704/1 |
| 2006/0095830 A1* | 5/2006 | Krishna | | G06K 9/2054 715/277 |
| 2008/0098292 A1* | 4/2008 | Embry | | G06F 40/174 715/226 |
| 2010/0161460 A1* | 6/2010 | Vroom | | G06Q 40/123 705/31 |
| 2010/0180213 A1* | 7/2010 | Karageorgos | | G06F 40/174 715/753 |
| 2011/0010356 A1* | 1/2011 | Berard | | G06Q 10/06 707/707 |
| 2011/0078098 A1* | 3/2011 | Lapir | | G06F 16/35 706/12 |
| 2014/0153830 A1* | 6/2014 | Amtrup | | H04N 1/40 382/190 |
| 2015/0039707 A1* | 2/2015 | Gregg | | G06F 16/93 709/206 |
| 2015/0324640 A1* | 11/2015 | Macciola | | G06Q 10/10 382/112 |
| 2016/0055376 A1* | 2/2016 | Koduru | | G06K 9/00449 382/176 |
| 2016/0092423 A1* | 3/2016 | Wilczek | | G06F 40/174 715/223 |

* cited by examiner

This invoice has already been sent by electronic means

Company, Inc.

555 Vendor Rd
New York, NY 10001

Commercial Invoice

Number: 114189350
Date: 01/12/2015

Bill to party: (210293)

Central Purchase
3 Manhattan Road
Purchase, NY 10577
USA

Delivery address:

Buyer Inc.
1600 Penn Avenue
Philadelphia, PA 16886
USA

Fig. 5

This invoice has already been sent by electronic means

Company, Inc.

555 Vendor Rd
New York, NY 10001

Commercial Invoice
Number: 114189350
Date: 01/12/2015

Bill to party: (210293)

Central Purchase
3 Manhattan Road
Purchase, NY 10577
USA

Delivery address:

Buyer Inc.
1600 Penn Avenue
Philadelphia, PA 16886
USA

This invoice has already been sent by electronic means

Company, Inc.

555 Vendor Rd
New York, NY 10001

Commercial Invoice
Number: 114189350
Date: 01/12/2015

Bill to party: (210293)

Central Purchase
3 Manhattan Road
Purchase, NY 10577
USA

Delivery address:

Buyer Inc.
1600 Penn Avenue
Philadelphia, PA 16886
USA

Fig. 8A

This invoice has already been sent by electronic means

Company, Inc.

555 Vendor Rd
New York, NY 10001

Commercial Invoice
Number: 114109350
Date: 01/12/2018

Bill to party: (210293)

Central Purchase
3 Manhattan Road
Purchase, NY 10577
USA

Delivery address:

Buyer Inc.
1600 Penn Avenue
Philadelphia, PA 16886
USA

Fig. 8B

This invoice has already been sent by electronic means

Company, Inc.

555 Vendor Rd
New York, NY 10001

Commercial Invoice

Number: 114189358
Date: 01/12/2015

Bill to party: (216293)

Central Purchase
3 Manhattan Road
Purchase, NY 10577
USA

Delivery address:

Buyer Inc.
1600 Penn Avenue
Philadelphia, PA 16886
USA

| Order No | Description | Quantity | Price | Value in USD |
|---|---|---|---|---|
| | SOMERSET MATTE WEB COVER 7PT | | | |
| | 88.5 Cover | | | |
| | Stencil Lines: CONVEO PO #854683-006CP | | | |
| | AMEX PROJECT 26574 | | | |
| | Ship-to P.O. number: 854683-060 PRO 26574 | | | |
| | Number of rolls: 15 | | | |
| | Customer Order No.: 5285327 | | | |
| | MICS Order No.: 8879123 | | | |
| | Container No.: 54483 | | | |
| | Stencil No.: 4816-13-0041 | | | |
| | Net Weight: 44,268 LB Gross Weight: 44,268 LB | | | |
| | MON-FRI | | | |
| | MUST CALL FOR DELIVERY APPT. | | | |
| | NO FORMAL DELY HOUR TIME RANGE - DELIVERY TIL 3:00 PM | | | |
| | CALL JIMMY TAYLOR FOR SET DELY TIME 814-684-6187 | | | |
| | SFI Certified at least 30% SFI Cert# BV-SFICOC-US07006220 | | | |
| | Width: 41 1/2" Diameter: 50" | 44,268 LB | 54.50 /100LB | 24,126.06 |
| | Freight allowed: | | 5.25 /100LB | 2,324.07- |
| | Freight prepaid: | | 5.25 /100LB | 2,324.07 |
| | Total freight allowed: | | | 2,324.07- |
| | Total freight prepaid: | | | 2,324.07 |
| | Total: | 44,268 LB | | 24,126.06 |
| | Total terms discount: | | | 216.83- |

Delivery Terms: CPT THROUGH
Payment terms:
  Up to 02/01/2015 you receive 1.000 % discount. Pay 23,908.04 USD
  Up to 02/02/2015 without deduction
Please pay to:

Fig. 10

SYSTEM AND METHOD FOR EXTRACTING DATA FROM A NON-STRUCTURED DOCUMENT

CROSS REFERENCE TO RELATED APPLICATIONS

This application claims priority from U.S. Provisional Patent Application Ser. No. 62/142,368 filed on Apr. 2, 2015, the entirety of which is incorporated herein by reference.

BACKGROUND OF THE INVENTION

Field of the Invention

The present invention relates generally to extracting data from a document.

Description of the Related Art

In various enterprises, both large and small, the process required for processing Accounts Payable invoice is complex and relies on multiple individuals operating within the enterprise to ensure that the billing information is correct in a timely manner. Enterprise resource planning software (ERP) is commonly used to integrate a solution to ensure that entered voucher information matches corresponding purchase order. It is known to scan physical documents and create a document data object that corresponds to the physical document. An on-going challenge is how to extract to information from the document data object for use with various aspects of the ERP software platform. One solution is to perform an optical character recognition (OCR) process on the document data object to recognize various characters which can be extracted from the document. However, a drawback associated with conventional OCR techniques is that they are unreliable and error prone. Additionally, even if the OCR correctly reads the characters in the document data object, there is limited contextual awareness resulting in extraction errors whereby the correct characters are extracted but are saved or otherwise placed in one or more incorrect data fields.

A system according to invention principles remedies any drawbacks associated with these conventional systems.

BRIEF SUMMARY OF THE INVENTION

Methods, systems, and computer-readable media for processing image file data are described.

In one embodiment, a method of extracting data from an electronic document is provided. A data object representing an electronic document having a plurality of data items each having at least one data value associated therewith is loaded from memory. The data object is searched for plurality of data items by keyword search for at least one candidate target data item. A target data item from the at least one candidate target data items is selected by identifying at least one ancillary data item known to be located within the electronic document proximate to the at least one candidate. A target field within the electronic document is generated to encapsulate the at least one data value associated with the selected target data item. A format of the at least one data value is compared with a predetermined data value format and the at least one data value is extracted from the target field in response to the format of the at least one data value matching the predetermined data value format for storage in a table of a database.

In another embodiment, a server apparatus that extracts data from an electronic document is provided. The server includes a controller and a memory coupled to the controller storing instructions that, when executed by the controller control the server to load, from a memory, a data object representing an electronic document having a plurality of data items each having at least one data value associated therewith. The server searches the plurality of data items in the electronic document by keyword search for at least one candidate target data items and selects a target data item from the at least one candidate target data items by identifying at least one ancillary data item known to be located within the electronic document proximate to the at least one candidate. A target field is generated within the electronic document to encapsulate the at least one data value associated with the selected target data item and a format of the at least one data value is compared with a predetermined data value format. The at least one data value is extracted from the target field in response to the format of the at least one data value matching the predetermined data value format for storage in a table of a database.

Some embodiments of the invention includes image processing devices that, at the direction of an operator, scans, via at least one image processing device, at least one invoice from at least one supplier that requires a further action. Data representing the at least one scanned invoice is communicated to at least one optical character recognition (OCR) server to generate an OCR document. The OCR server parses the OCR document to identify at least two sets of data items within a predetermined proximity to one another within the OCR document to create a compound data item, the at least two sets of data items including a target data item and at least one ancillary data item. A target field is created adjacent the target data item and extends to an edge of the OCR document to encapsulate at least one further data item therein. The OCR server identifies the at least one further data item and compares a format of the identified at least one further data item to a predetermined data item format and extracts the at least one further data item if the formats match and stores the extracted data in a database.

In some embodiments, the OCR server can combine a plurality of data items in the target data item field into a composite data item by comparing the format of each of the plurality of data items and comparing each of the individual data item formats and a format of the data items when combined to determine if the predetermined data item format is met. This process is iterative and ends when the OCR server fails to identify any further data items in the target data item field or when the OCR server attempts to combine, into the composite data item, one data item with one or more other data items previously identified and a format of the composite data item does not match the predetermined format. In this instance, the OCR server would extract, as the composite data item, the one or more data items so long as a format of the combined one or more data items matches the predetermined data item format.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 illustrates a data object representing an electronic document according to invention principles.

FIG. 6 illustrates processing techniques performed on the data object of FIG. 5 according to invention principles.

FIG. 7 illustrates processing techniques performed on the data object of FIG. 5 according to invention principles.

FIGS. 8A & 8B illustrate processing techniques performed on the data object of FIG. 5 according to invention principles.

FIG. 10 illustrates processing techniques performed on the data object of FIG. 5 according to invention principles.

DETAILED DESCRIPTION OF THE INVENTION

According to invention principles, a system and method is provided that improves the operation of a computing device by reducing an amount of time need to complete a particular task thereby reducing the resources required, both human and machine-based, to complete the task.

Figure 1:
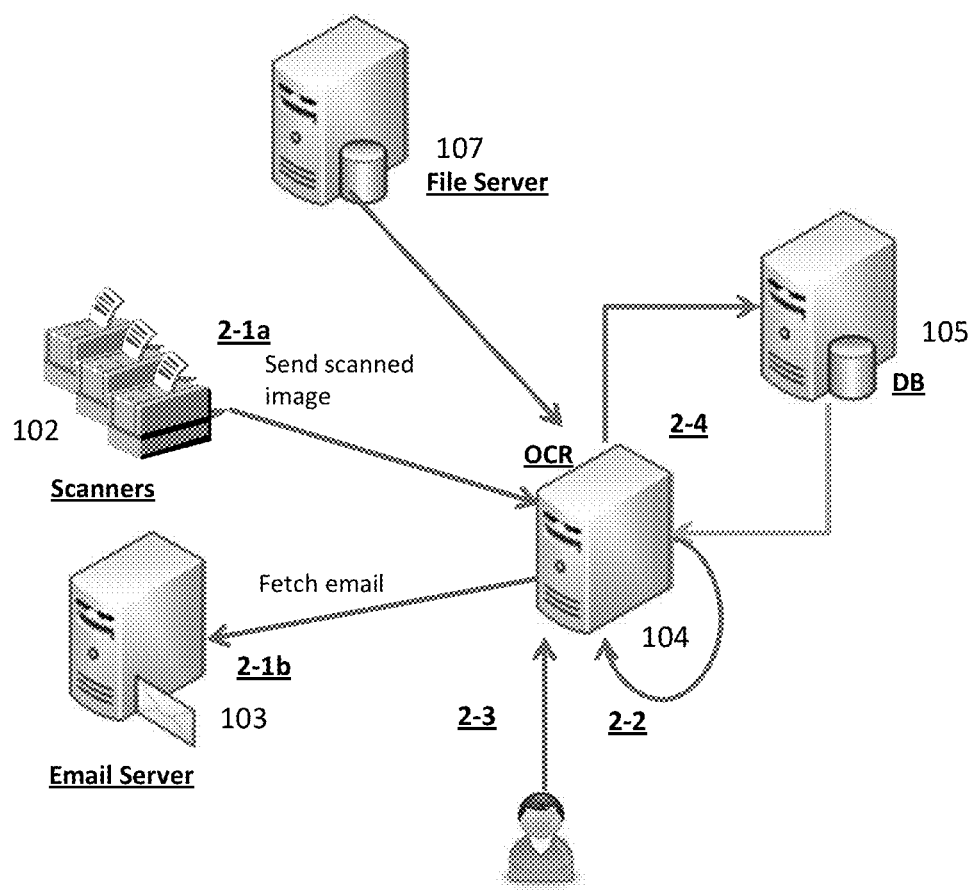
FIG. 1 illustrates an exemplary environment including hardware that perform various operations according to invention principles.

FIG. 1 illustrates a block diagram of various computing devices that execute on or more processes described herein. Also shown in FIG. 1 is an exemplary operational flow that details the operational steps undertaken by each component throughout system operation. In particular the system includes an image processing device 102 (e.g. scanner and/or multifunction peripheral having scan, print and communication functionality) that enables generation of electronic data representative of a physical document. The scanner 102 communicates the electronic document to one or more servers 104 that at least one of (a) perform optical character recognition on the electronic document data and determine which of the recognized characters or sets of characters are to be extracted from the electronic document and stored in a server for use at a later time. In one embodiment, the image processing device is a multifunction peripheral device that includes scan functionality, print functionality and data transmission and receipt functionality. The image processing device may be coupled to a communications network (e.g. LAN and/or WAN) and communicate with each of the other components depicted in FIG. 1. In one embodiment, the electronic document represents an invoice and is a non-structured document. A non-structured document may include any document where the structure and formatting of the data in the electronic document is unknown at a time of OCR processing. Additionally, non-structured documents refer to types of documents that include similar types of data contained therein but a position of the data in the document is different in a document of the same type but which is derived from a different source. For example, a document type may be an invoice document and the invoice document may include a data item corresponding to a "Total" cost for either the good or service associated with the invoice. However, different suppliers/vendors may position the "Total" data item at different positions on the page within the document. Moreover, the "Total" data item may be surrounded by other data items that are similarly named or surrounded by data items related to the "Total". The positional variation of the "Total" data item within the electronic document gives rise to the electronic document being non-structured.

In another embodiment, the electronic document data may also be acquired via electronic messaging via an email server 103 which communicates electronic data representative of a physical data over a communication network to the OCR server 104 where the electronic document data undergoes optical character recognition processing.

The OCR processing occurs in the flow at steps labeled 2-1a/2-1b through steps 2-4. The OCR processing described herein advantageously enables the OCR server to identify and extract data items from within an electronic document with a high degree of reliability and accuracy. In particular, the improvement to the OCR capability relates to the ability to both recognize and contextualize particular text from the electronic document data. In doing so, the OCR server loads into memory electronic document data and identifies a plurality of data items from within the electronic document data and advantageously determines a relationship between the plurality of data items for use in selecting a particular value associated with one of the plurality of data items for a particular purpose.

Figure 4A:
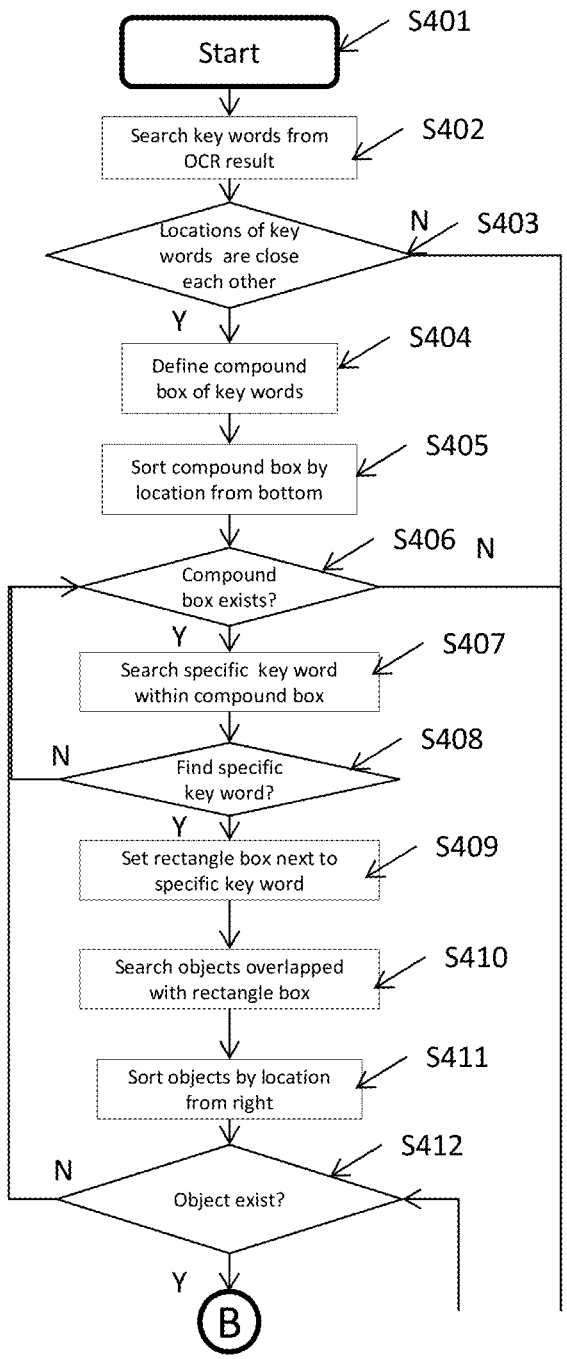
FIGS. 4A and 4B are flow diagrams detailing an algorithm according to invention principles.
Figure 4B:
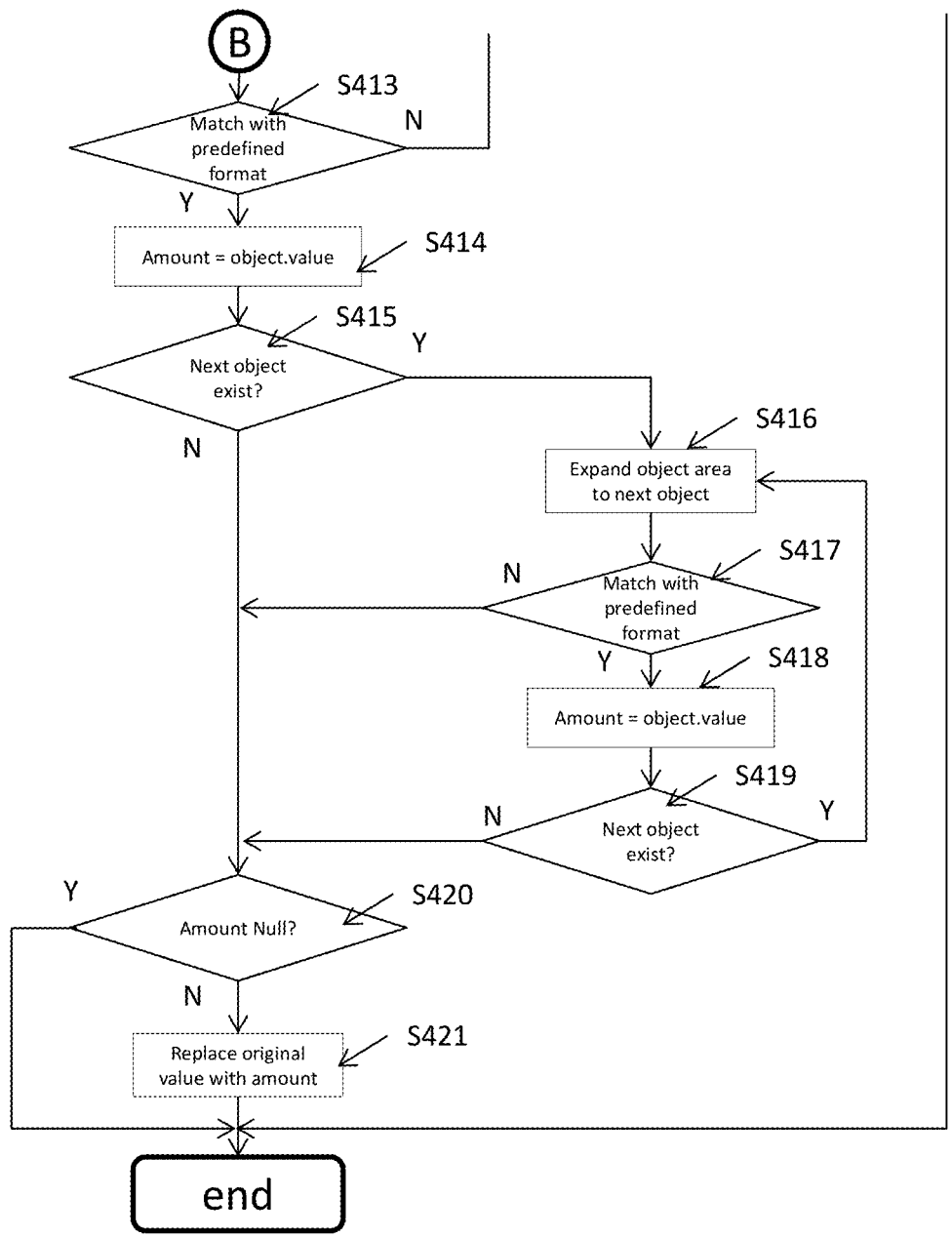

The OCR server may include one or more applications or algorithms stored in memory and, when executed by a controller or central processing unit of the server 104, enables the OCR server 104 to perform the functionality described with respect to FIGS. 4A & 4B. In one embodiment, the OCR server 104 performs complete OCR processing on an electronic document to identify a plurality of data items contained therein so that particular target data item values can be identified from within the electronic document and extracted therefrom with a high degree of reliability and accuracy. As used herein a data item may include one or more characters recognized by the OCR processing performed on the electronic document. For example, if a set of characters in the electronic document are "Total Items", one exemplary data item may be "total" and a second exemplary data item may be "items". This is described to illustrate the principles herein but it should be understood that the data item may or may not include the complete word and instead may be "to" and "tal" which, when parsed, can be intelligently identified by the OCR engine such that these two data items represent a single term "total". This same principle applies to any numerical characters recognized as well. An example of how numerical characters may be recognized and strung together will be discussed hereinafter with respect to FIGS. 8A and 8B.

A data object representing a physical document that has undergone OCR processing is loaded into memory. A position map for the electronic document is generated and stored in memory. The OCR server 104 parses the data items identified by the OCR processing in order to identify target data item values associated with a target data item. In one embodiment, a position map may be created by defining, based on pixel positions within the electronic document data, position information corresponding to each data item identified by the OCR processing. The position data may be stored in a mapping table for later use. In one embodiment, the OCR engine uses a set of search criteria that includes at least the target data item and at least one other data item associated with the target data item. The search criteria are contained in a search criteria table of a database which has been pre-populated. The search criteria table includes a plurality of records each corresponding to the desired target data item value to be extracted. The table further includes a number of columns each corresponding to data items known to be included in the electronic document. A respective one of the columns is identified as including the target data item and all other columns are the associated other data items.

When the search locates identified data items that correspond to both the target data item and the at least one other associated data item, the positions of the target data item and at least one other associated data item are located using the position map of the electronic document. The OCR engine determines whether or not the target data item and at least one associated data item are within a predetermined distance from one another within the electronic document to determine if a compound data item is present. In one embodiment, a distance value of a predetermined number of pixels is used as the threshold for determining whether or not the target data items and at least one associated data items are properly grouped to form the compound data item. In one embodiment, the predetermined number of pixels is a value ranging between 25 and 100 pixels in at least one of a vertical direction and a horizontal direction within the electronic document data. In another embodiment, the predetermined number of pixels is equal to 50 pixels in one of a vertical or horizontal direction from identified data item.

If it is determined that a compound data item is present, the location of the target data item within the compound data item is determined. The location includes a height such that a character within the target data item including the highest number of vertical pixels is identified and a predetermined number of pixels on each end of the character are added thereby defining a height of the target data item.

The height of the target data item is used as a height of a target data item field which is created to extend horizontally away from the target data item until the edge of the electronic document. The target data item field encapsulates data items that may potentially represent the value associated with the target data item which is to be extracted and stored in the database. The value to be extracted will be formatted according to a predetermined data item format.

The OCR engine of the OCR server 104 determines an initiation point at which further parsing is to begin. In one embodiment, the OCR engine uses the pixel coordinates that are both within the target data item field and that is at the right most edge of the electronic document. The OCR engine parses the identified data items within the target data item field in a direction from a right most edge of the electronic document away from the right most edge and towards the target data item. The directional description should be understood such that the right most edge of the electronic document is the right side of user who would be viewing the document on a display screen.

Upon detecting a first data item in the field, the OCR engine compares the format of the first data item with the predetermined data item format. If the format matches, the data item is flagged. The OCR engine proceeds to a second data item to the left of the first data item and compares that format of the second data item with the predetermined format. If the format matches then, the second data item is also flagged. If the format does not match, the first and second data items are combined into a composite data item, the format of which is then compared to the predetermined data item format. If the format of the composite data item does not match, only the first data item is determined to be the value of interest and that value is extracted and stored in an associated field of a database for later use. If the format of the composite data item does match the predetermined format, the composite data item is flagged and the OCR engine parses any further data items in the target data item field. This process is repeated until either there are no data items remaining in the target data item field or in response to determining that a format of the combined data items does not match the predetermined format.

In one embodiment, this OCR procedure is the complete OCR procedure that is used to identify target data item values for extraction and storage. In other embodiments, this OCR procedure may be a secondary OCR procedure that is used to check if a target data value that has previously been extracted after completion of a first OCR procedure and stored in a database is accurate. In this verification embodiment, if the data value extracted in the secondary, verification, OCR procedure, that data value is presumed to be more accurate in view of the context sensitivity from which it was derived. In other embodiments, the OCR server may include a decision engine to implement rules that would allow for an intelligent comparison of the value extracted during the second OCR procedure with the value extracted in the first OCR. Such decision rules may take into account data values extracted from one of (a) other positions or fields within the same document and (b) data values extracted from positions or fields in other documents related with or otherwise associated with the electronic document. For example, if the electronic document from which the values have been extracted is an invoice, the system can advantageously identify related documents such as purchase orders (for example by using a common identifier that has previously been extracted such as customer name, order number, product identifier, etc.) to identify values that are contained there and which may be the extracted data value. In this instance, the system can compare each of the second extracted data value and first extracted data value with a data value in a field of a related document to determine which of the first or second extracted data values is more accurate.

Figure 2:
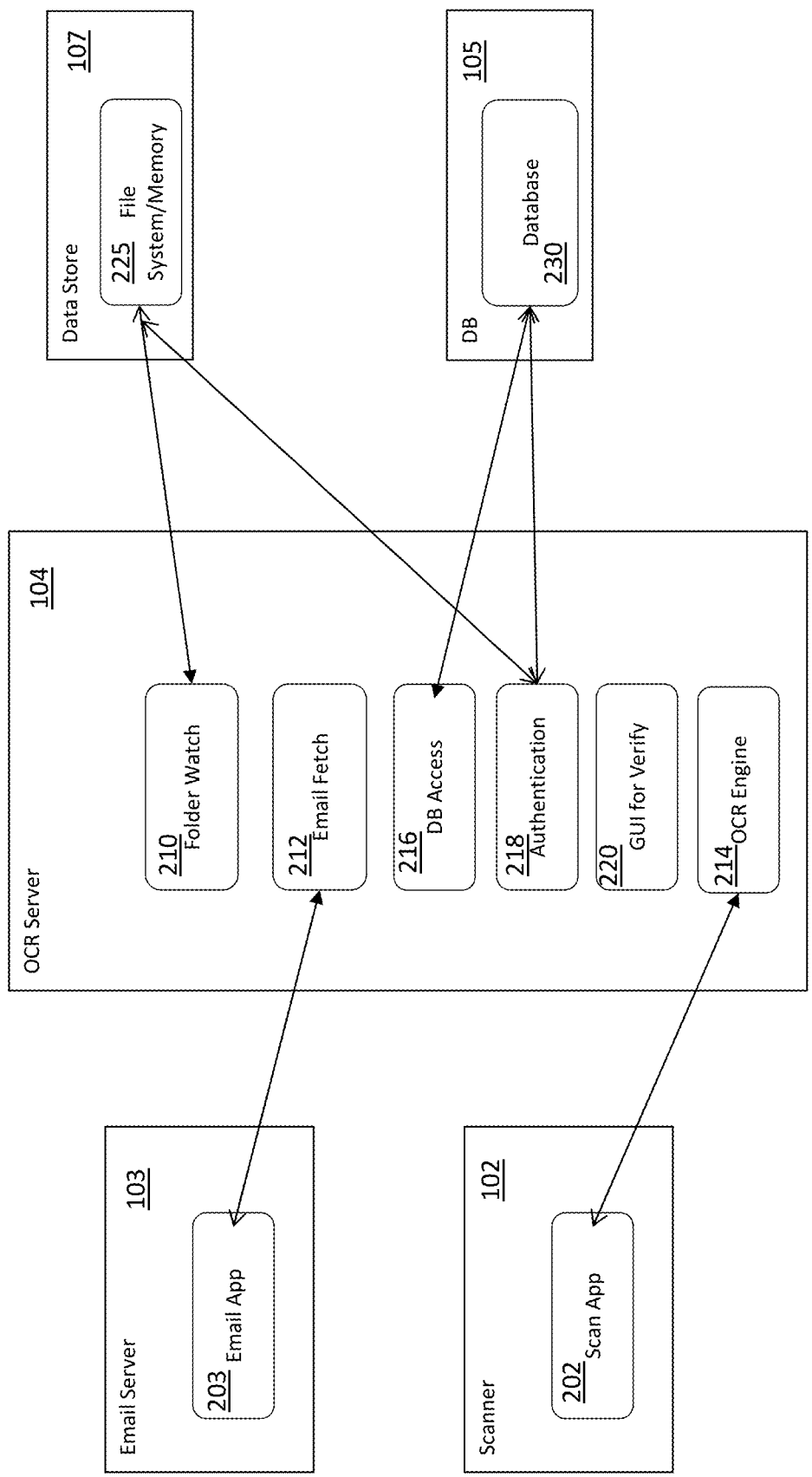
FIG. 2 illustrate exemplary software modules stored in memory that are executed by controllers of the hardware devices shown in FIG. 1 according to invention principles.

FIG. 2 illustrates a block diagram of the various components shown in FIG. 1 that include the various applications (e.g. software modules) that are stored in the respective memory of the component and are executed by the one or more processors of the component. The various software modules which are stored in memory and executed by a controller of the device in which the module is stored will now be described. In email server 103 an email application 203 is stored in a memory thereof and when executed by a controller of the email server controls the email server to send and receive a plurality of different types of electronic communication messages using one or more messaging protocols such as SMTP, POP3, IMAP, etc. The image processing device 102 may include a plurality of different types of applications to execute one or more functions thereof. In one embodiment, the image processing device 102 includes a scanning application 202 which operates to control a scanner device to digitize a physical document into a digital image and compress that image to be stored as the electronic document data discussed above. The scanner application may control an image capture device which captures the image of a physical document that is one of positioned on a platen or which is automatically fed over a platen by a document feeder apparatus. A light source illuminates the physical document and the image capture device captures an image in order to digitize physical document which is then stored in a particular electronic data format such as portable document format (PDF). The scanner application 202 may also include communication functionality which enables connection with a network (WAN/LAN) to transmit the electronic document data representing the physical document to a destination system such as the OCR server 104.

The OCR server 104 includes a plurality of applications that control how electronic document data is obtained thereby from a plurality of different sources. The OCR server 104 includes an OCR engine 214 that performs an optical character recognition process on electronic document data that is received by the OCR server 104. The OCR engine loads an electronic document data into memory and recognizes text based data contained in the electronic document in order to create a modified electronic document data whereby the text characters may be searchable and extractable at a later time. The OCR engine 214 also enables context-based recognition of data items contained in the electronic document in order to identify a desired data item from within and any values associated with the desired data item that should be extracted and provided to a destination system for use thereby. In on embodiment, the OCR engine performs the steps according to invention principles discussed herein such as those in FIG. 4. In one embodiment, the OCR application 214 performs OCR processing on an electronic document and extracts data values contained therein. These data values may be compared to a set of master data, export PDF and extracted master data to server for further processing.

The remaining applications executing on OCR server 104 control the acquisition and transmission of electronic document data and modified electronic document data representing an OCRed version of the electronic document data generated by the OCR engine.

A Folder Watch application 210 is a monitoring application that monitors one or more file storage locations 225 stored on a data store 107. In the event a data file having a predetermined data format is detected at the storage location 225, the folder watch application 210 acquires the detected electronic data file and provides the acquired file to the OCR engine 214 to perform OCR processing. A single data store 107 having a single file system/memory is described for purposes of example only and any number of these are possible. Moreover, the folder watch application 210 may be able to selectively watch a plurality of different storage locations 225 on a plurality of different data stores dispersed through both local and wide area networks.

An email fetch application 212 is similar to the file watch application 214 in operation but instead of watching a file system folder for document, the email fetch application 212 monitors a status of one or more inboxes on the email server 103. In operation the email fetch application detects whether an electronic mail message contains an attachment representing an electronic document and determines if the attachment is of a predetermined format. If so, the email fetch application 212 acquires the electronic document data to be provided to the OCR engine 214 for OCR processing. In one embodiment, the email fetch application 212 may use a plurality of monitoring rules to not only monitor the presence of an attachment to an email but also to detect context within particular emails so that it know whether or not it should acquire the attachment. For example, the email fetch application may operate using a keyword term "invoice" and only acquire the electronic document if the keyword is detected in one of the email body, subject line and/or file name of the attachment. In another example, the email fetch application 212 may monitor addressors and/or addressees of the email such that if the email was sent by a particular individual, the email fetch application 212 determines that any electronic document attached thereto should be acquired to undergo OCR processing.

A database access application 216 enables interaction and searching of one or more tables 230 of database 105. In one embodiment, one or more tables of the database 230 may be queried by the database access application to acquire the target data items which may be used to perform data value extraction from the non-structured document as discussed herein. In another embodiment, the database access application 216 may also communicate with the database 105 to store the extracted data values in a particular table for one or more purposes.

In another embodiment, the OCR server 104 includes graphical user interface (GUI) generator 220 which generates one or more user interfaces for display on a display device and enables a user to verify the processing performed by the OCR engine. For example, after the electronic document is modified and data values are extracted, the GUI generator 220 may generate a user interface that shows both an image of the electronic document and a series of target data item fields which have been populated based on the OCR processing and extraction. In this manner, the user is presented with an ability to confirm that the correct values have been extracted prior to communication of the extracted values to the database 105 for storage in the table 230 by the database access application 214. Further, an authentication application 218 is present and requires that a user authenticate themselves with one or more authentication credentials prior to using the GUI for verification purposes. In another embodiment, the authentication application 218 may control authentication processing needed to access one of the database 105 or data store 107.

Figure 3:
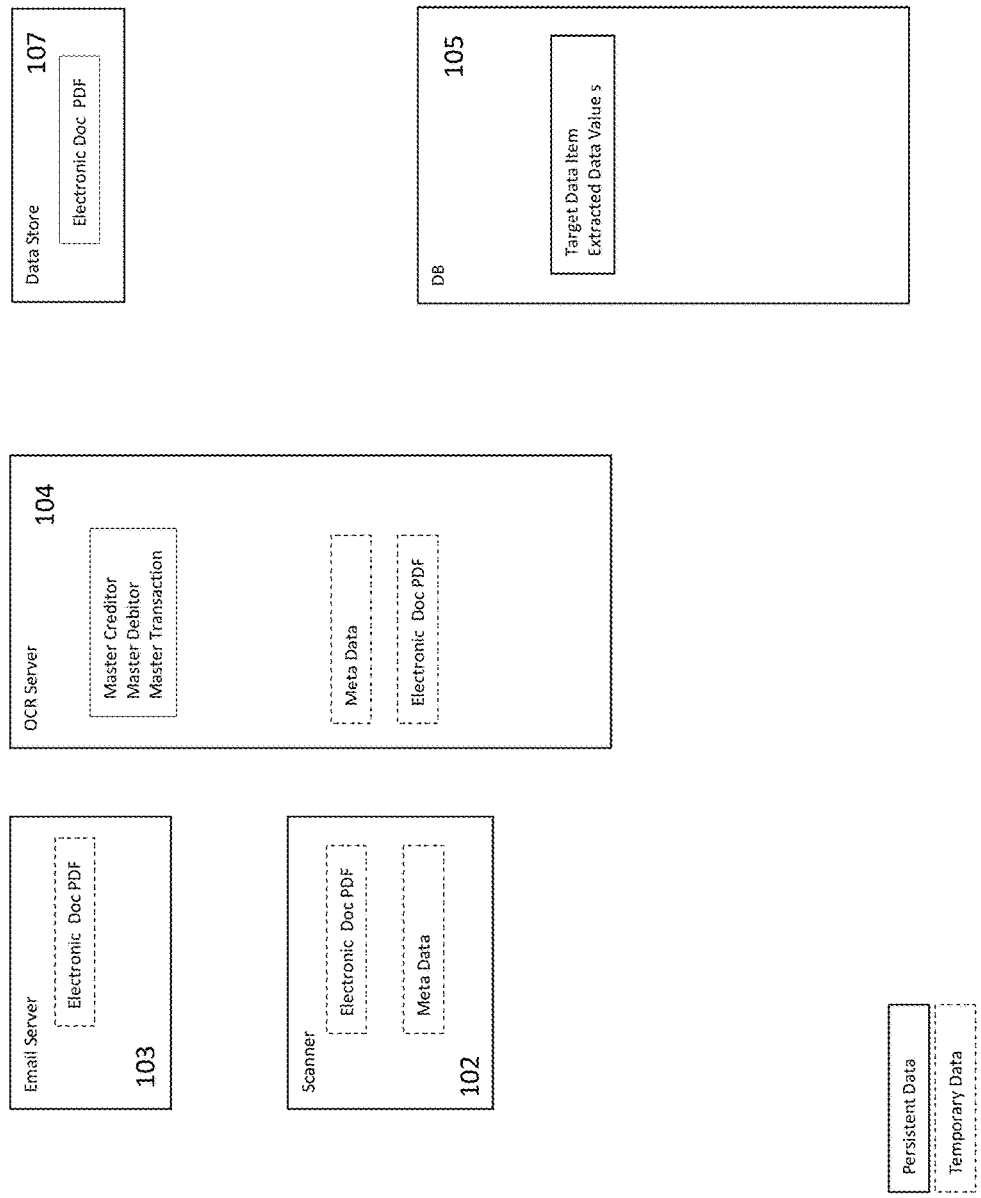
FIG. 3 illustrates the memory devices of the hardware devices of FIG. 1 showing the manner in which certain data objects are stored therein.

FIG. 3 details a block diagram that illustrates the various locations that data, generated by the one or more applications shown in FIGS. 1 and 2, may be stored and accessed. The data stored may be persistent data identified by a solid border and temporary data identified by a dashed border.

FIGS. 4A and 4B illustrate the OCR process implemented by the OCR engine which is stored in a memory and loaded into operational memory when executed by the processor of the server on which the OCR engine application resides. In general, execution of the OCR engine includes performing a complete optical character recognition process on an electronic document received by an OCR server. The OCR process results in generating a plurality of data items that comprise the electronic document where each respective data item is formed form at least one alphanumeric character.

The description of the OCR document being received by the server is provided for purposes of example only and the OCR application need not be stored on a server or other computing device and instead could be stored in the storage medium of an image processing device or image forming device such as the one described hereinafter with respect to FIG. 12. In some embodiments, the system according to invention principles can receive the electronic document via scan, email, or file transfer protocol.

The OCR processing and extraction steps described with respect to FIGS. 4A and 4B enable the operation and functions of the OCR system described above with respect to FIG. 1. To illustrate the operation and control logic of the OCR application according to invention principles, the following description will be made using an electronic document data (e.g. image data) representing an invoice, such as shown in FIG. 5, as the electronic document data object that will be processed and from which data will be extracted. It should be understood that the description of the electronic document data object being an invoice is provided for purposes of example only and the logic for extracting a desired target data item value described hereinafter can readily be applied to any other type of electronic document data object.

The algorithm starts in step S401 by performing OCR processing on the electronic document data object. This process identifies and generates a plurality of data items within the electronic document that include alphanumeric characters recognized by the OCR application. A data item may include a value associated therewith that is sought to be extracted. For example, a data item in an electronic document representing an invoice may be "Total" and adjacent thereto within the document may be other alphanumeric text recognized via the OCR application such as "$1000.00". This indicates that the value of the data item "Total" is "$1000.00". In another embodiment, the value associated with the data item may be a further data item. In some instances, the data items may represent complete words or terms that are meaningful to one of a system or user operating a system. In other instances, the data items may include one or more characters that, when combined with other data items, form complete words or terms that are meaningful to one of a system or user operating the system. A term or word is meaningful when that term of word is one of (a) able to be stored in an associated field of a database; (b) used as an input value to one or more portions of a computing program resulting in further processing or action occurring based on the input thereof; and (c) provides a user or system with a conventionally understood idea related to a business workflow.

Once OCR has been completed and the plurality of data items have been identified, the OCR engine initiates a search of the data item using a plurality of key words. The key words are acquired from a keyword table in a database. The key words represent a target data item, the value of which is sought to be extracted, and at least one associated data item that is known to be in close proximity, within the electronic document, to the target data item. The application initiates this search by querying a key word table such as shown below in Table 1.

TABLE 1

Key Word Table

| Key | First Data Item | Second Data Item | Third Data item |
|---|---|---|---|
| Invoice 1 | Total Freight Allowed | Total Freight Prepaid | Total |
| Invoice 2 | Element 1 | Element 2 | Element 3 |

The key word table is formatted such that each row represents a source of the electronic document and each column includes a data item to be used as an input for a search algorithm that searches the data items identified by the OCR process for the presence of these key words. Additionally, the application references a target data item table such as shown below in Table 2 which uses the source of the electronic document as the key and includes a column number of in Table 1 that references the target data item, the value associated therewith, is what is to be extracted.

TABLE 2

Target Data Item Table

| Key | Target Data Item Column |
|---|---|
| Invoice 1 | 3 |
| Invoice 2 | 2 |

In this example, Table 2 indicates that, for invoice 1, the target data item is stored in column 3 of Table 1. The importance of identifying the target data item will be discussed below.

In other embodiments, Tables 1 and 2 include a record for invoice 2 (not shown in any drawings). The key words for invoice 2 are Element 1, Element 2 and Element 3 and Table 2 instructs the application that the key word "Element 2" is the target data item. Thus, the keyword search table can be populated with any number of keyword that are used as inputs to a search query and need not be in any specific order or format in view of link provided between Tables 1 and 2. In other embodiments, only a single table can be used whereby the single table has one column that is automatically identified as including the target data item.

It should be noted that the data stored in Tables 1 and 2 may be one of provided from the source of the electronic document based on identifiers known to be in their electronic documents and which are grouped within a predetermined proximity to one another. Alternatively, the tables can be populated manually by a user of the system who manually review and identifies key words within the electronic document that are commonly located within a predetermined proximity to one another. In a further embodiment, the data stored in Tables 1 and 2 may be dynamically determined based on a training algorithm which uses different versions of the same type of electronic document to identify and extract data items whereby the training algorithm learns which data items are meaningful based on a number of instances the same data item appears across the different versions of the same type of electronic document. For example, a training algorithm may parse a plurality of different formatted electronic invoice data to identify common terms and usage and to identify whether or not the data items identified therein have values associated therewith. If the determination meets a predetermined criteria, that data item may be populated into the Tables and used by the system when querying future electronic document data for relevant data items.

In step S403, once the keyword search has been initiated and data items generated by the OCR process have been determined to match the keywords used as inputs to the search query, the application determines if the data items from within the electronic document matching the keywords are within a predetermined distance from one another. In one embodiment, the application identifies positions of each of the located data items corresponding to keywords, on a pixel by pixel basis, and calculates a distance between each of the data items to determine of the distance exceeds a certain pixel threshold. If the distance exceeds the threshold, then the result of the query in step S403 is negative and the process ends at step S422. If the distance is less than or equal to a the pixel threshold, the result of the query in step S403 is positive and operation proceeds to step S404 where the application defines a compound data item field encapsulating all of the data items determined to match the keywords listed in Table 1. An example of this operation is shown in FIG. 6.

In step S405, the application begins to analyze the plurality of data items in the compound box to determine the position of the target data item. It is at this point the application queries Table 2 to identify which of the plurality of data items is the target data item. Based on the example here, the target data item is the word "Total" because Table 2 instructs the application that the value stored in column 3 of Table 1 is the target data item. The application begins a predetermined pixel position (generally a position within the compound data item field closest to the bottom of the page) and searches the data items within the compound data field in a direction towards the top of the electronic document for the target data item. An example of this is shown in FIG. 7.

In step S406, the application determines if the compound data item field is present. If the result of the query in S406 is negative, the process ends at step S422. If the query in S406 is positive indicating that the compound data item field is present, the application searches the individual data items contained therein for the keyword representing the target data item in step S407. In step S408, the application queries whether or not the target data item is present (see FIG. 7). If the result of the query in S408 is positive, the application defines a target data item field in step S409. This is illustrated in FIG. 8A. The target data item field extends from a position of the target data item to an edge of the electronic document opposite the position of the located target data item. As shown herein in FIG. 8, the target data item field extends from a left side of the document to the right most edge of the electronic document. The creation of this field is done on a pixel-by-pixel basis in order to encapsulate other data items recognized by the OCR process which may include the data value sought to be extracted.

Figure 7:
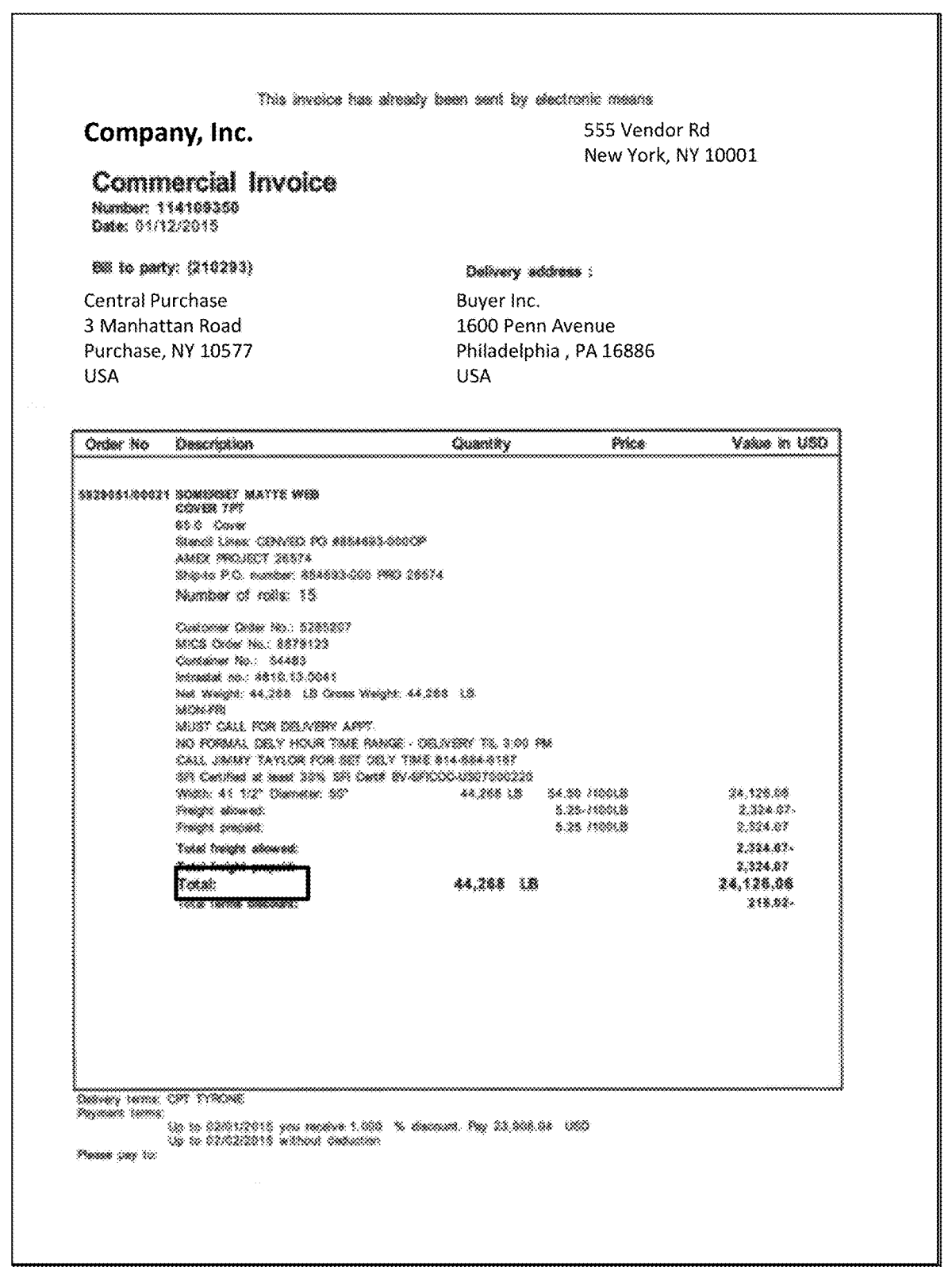

In step S410, a plurality of data items encapsulated within the target data item field are searched and in step S411, the data items are sorted beginning at a direction furthest from the target data item shown in FIG. 7. Thereafter, the application determines if a data item (e.g. data object) exists in S412. If the result of the query is positive, in step S413, the application compares a format of the identified data item (object) with a predetermined data item format known to correspond to the type of data value sought to be extracted. In this example, the type of data value sought to be extracted is a US currency value having a format "$XX,XXXX.XX".

Continuing to FIG. 4B, in step S413, a format of the data object located in S412, is compared with the predetermined currency format above. If a positive match is detected, the application sets, step S414, an "object.value" parameter equal to the data item located in S412 of FIG. 4A. In step S415, the application continues in a direction away from the edge of the electronic document and towards the target data item to determine if other data items exist. If the result if this query is negative, the application determines if the value is "Null" in S420. If the query in S420 is negative, the value of the data item identified in S412 is stored in a database. In some instances, this may include replacing a previously stored data value. If the result of the query in S415 is positive, the application expands it search to the next adjacent data item within the target data item field in step S416. In step S417, a format of the next data item is also compared to the predetermined format above. The step may include comparing the format of the value of the next data item itself with the predetermined format as well as combining the data item identified in S412 with the data item identified in S417 to generate a composite data item, the format of which is compared to the predetermined format. If the composite data item format matches, then the "object.value" parameter is set equal to the value derived from the composite data item in step S418. This is illustrated in FIG. 8B.

Thereafter, this process continues in step S419 to determine if any other data items are included in the target data item field. If the result of this query is positive, the application repeats steps S416-S419 until the result of S419 is negative. Once the "object.value" parameter has been set, the application determines, in S4120, whether the value of "object.value" is "null". If not, the value associated with "object.value" is extracted and stored for later use in step S412.

This process, while described as extracting the monetary total of the invoice in FIG. 5, can be extended to increase the accuracy and reliability of the data extracted from the electronic document by providing the OCR recognition and extraction application an enhanced context so that the OCR no longer needs to rely solely on the position of data items within a document to make the extraction determination.

Figure 9:
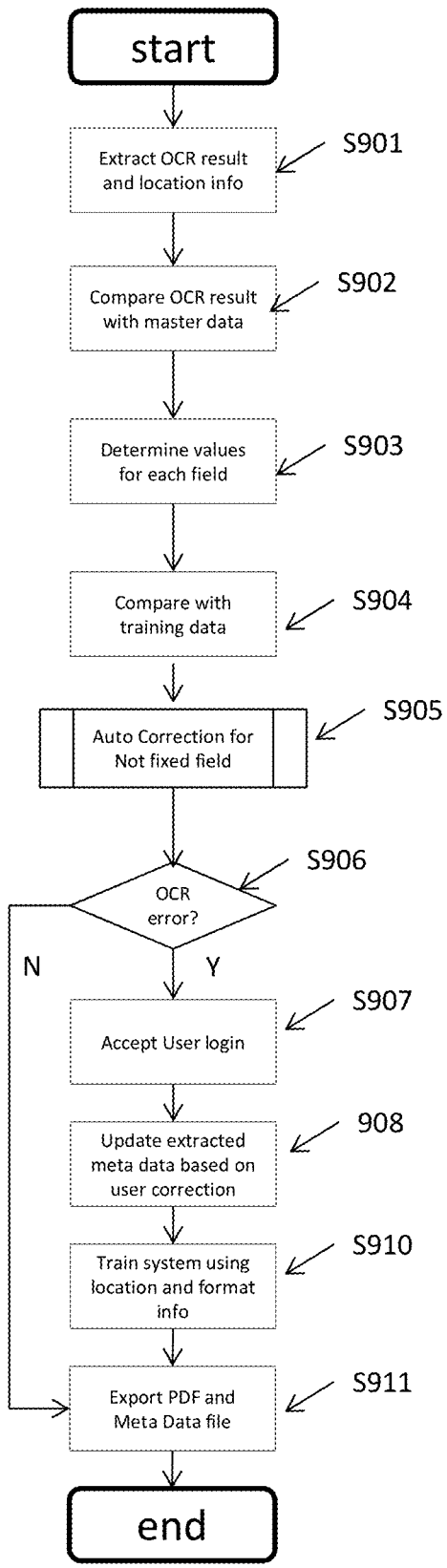
FIG. 9 is a flow diagram detailing an algorithm according to invention principles.

FIG. 9 is a flow diagram detailing another embodiment of the OCR application described herein. The embodiment shown in FIG. 9 illustrates a data value verification algorithm where the OCR process described in FIGS. 4A & 4B and is a secondary OCR process performed on the electronic document to determine if the data values extracted in a first OCR process are correct. In this embodiment, the OCRed data items and location data are extracted from the electronic document in S901. The algorithm OCR's the electronic document and compares the OCRed document with a set of master data in step S902. Values for each of the OCRed fields are derived based on proximity recognition such that once a data item has been identified, other data items with in predetermined proximity, as determined on a pixel by pixel basis, are identified as the values to be extracted in step S903 and the extracted values are compared with a set of training data in S904. Thereafter, in step S905, an autocorrection of this data is performed by undertaking and performing a second OCR process on the same electronic document using the algorithm described in FIG. 4.

In step S906, the algorithm queries whether the result of the verification is that an OCR error is present. If the result of the query in S906 is negative indicating that no error is present, the algorithm proceeds to step S911 whereby an image file in a predetermined image format is exported along with the metadata associated therewith. If the result of the query of S906 is positive, the system advantageously utilizes secure login processing in step S907 to determine whether or not a particular user can change the extracted value from the value determined in the first OCR procedure with the value extracted from the second verification procedure. In step S908, metadata for a set of extracted data is updated in response to a user entering corrected information. In step S910, a training process is performed using the updated information as well as the location and format information extracted from the electronic document and an updated image file in a predetermined image format is exported along with the updated metadata based on the correction information.

Figure 11:
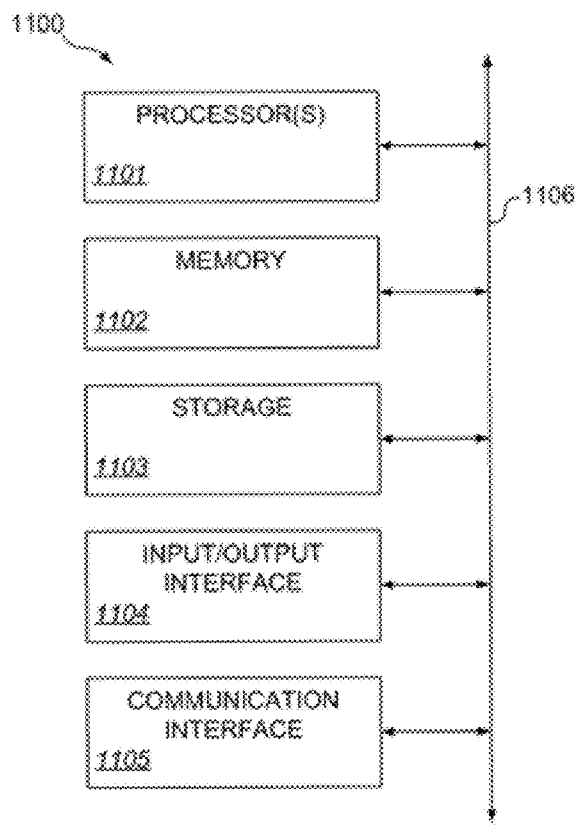
FIG. 11 is a block diagram detailing the components of the server computing system according to invention principles.

FIG. 11 an example computing system 1100. According to various embodiments, all or a portion of the description of the computing system 1100 is applicable to all or a portion of one or more of the client computing system and one or more server computing system.

The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as a memory and processor) work together to perform operations on electronic data. Also, the term resource as used herein includes but is not limited to an object that can be processed at a computing system. A resource can be a portion of executable instructions or data.

In some embodiments, the computing system 1100 performs one or more steps of one or more methods described or illustrated herein. In some embodiments, the computing system 1100 provides functionality described or illustrated herein. In some embodiments, software running on the computing system 1100 performs one or more steps of one or more methods described or illustrated herein or provides functionality described or illustrated herein. Some embodiments include one or more portions of the computing system 1100.

The computing system 1100 includes one or more processor(s) 1101, memory 1102, storage 1103, an input/output (I/O) interface 1104, a communication interface 1105, and a bus 1106. The computing system 1100 may take any suitable physical form. For example, and not by way of limitation, the computing system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, PDA, a server, a tablet computer system, or a combination of two or more of these.

The processor(s) 1101 include hardware for executing instructions, such as those making up a computer program. The processor(s) 1101 may retrieve the instructions from the memory 1102, the storage 1103, an internal register, or an internal cache. The processor(s) 1101 then decode and execute the instructions. Then, the processor(s) 1101 write one or more results to the memory 1102, the storage 1103, the internal register, or the internal cache. The processor(s) 1101 may provide the processing capability to execute the operating system, programs, user and application interfaces, and any other functions of the computing system 1100.

The processor(s) 1101 may include a central processing unit (CPU), one or more general-purpose microprocessor(s), application-specific microprocessor(s), and/or special purpose microprocessor(s), or some combination of such processing components. The processor(s) 1101 may include one or more graphics processors, video processors, audio processors and/or related chip sets.

In some embodiments, the memory 1102 includes main memory for storing instructions for the processor(s) 1101 to execute or data for the processor(s) 1101 to operate on. By way of example, the computing system 1100 may load instructions from the storage 1103 or another source to the memory 1102. During or after execution of the instructions, the processor(s) 1101 may write one or more results (which may be intermediate or final results) to the memory 1102. One or more memory buses (which may each include an address bus and a data bus) may couple the processor(s) 1101 to the memory 1102. One or more memory management units (MMUs) may reside between the processor(s) 1101 and the memory 1102 and facilitate accesses to the memory 1102 requested by the processor(s) 1101. The memory 1102 may include one or more memories. The memory 1102 may be random access memory (RAM).

The storage 1103 stores data and/or instructions. As an example and not by way of limitation, the storage 1103 may include a hard disk drive, a floppy disk drive, flash memory, an optical disc, a magneto-optical disc, magnetic tape, or a Universal Serial Bus (USB) drive or a combination of two or more of these. In some embodiments, the storage 1103 is a removable medium. In some embodiments, the storage 1103 is a fixed medium. In some embodiments, the storage 1103 is internal to the computing system 1100. In some embodiments, the storage 1103 is external to the computing system 1100. In some embodiments, the storage 1103 is non-volatile, solid-state memory. In some embodiments, the storage 1103 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 1103 may include one or more memory devices. One or more program modules stored in the storage 1103 may be configured to cause various operations and processes described herein to be executed.

The I/O interface 1104 includes hardware, software, or both providing one or more interfaces for communication between the computing system 1100 and one or more I/O devices. The computing system 1100 may include one or more of these I/O devices, where appropriate. One or more of these I/O devices may enable communication between a person and the computing system 1100. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 1104 includes one or more device or software drivers enabling the processor(s) 1101 to drive one or more of these I/O devices. The I/O interface 1104 may include one or more I/O interfaces.

The communication interface 1105 includes hardware, software, or both providing one or more interfaces for communication (such as, for example, packet-based communication) between the computing system 1100 and one or more other computing systems or one or more networks. As an example and not by way of limitation, the communication interface 1105 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 1105 for it. As an example and not by way of limitation, the computing system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 1100 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The computing system 1100 may include any suitable communication interface 1105 for any of these networks, where appropriate. The communication interface 1105 may include one or more communication interfaces 1105.

The bus 1106 interconnects various components of the computing system 1100 thereby enabling the transmission of data and execution of various processes. The bus 1106 may include one or more types of bus structures including a memory bus or memory controller, a peripheral bus, and a local bus using any of a variety of bus architectures.

Figure 12:
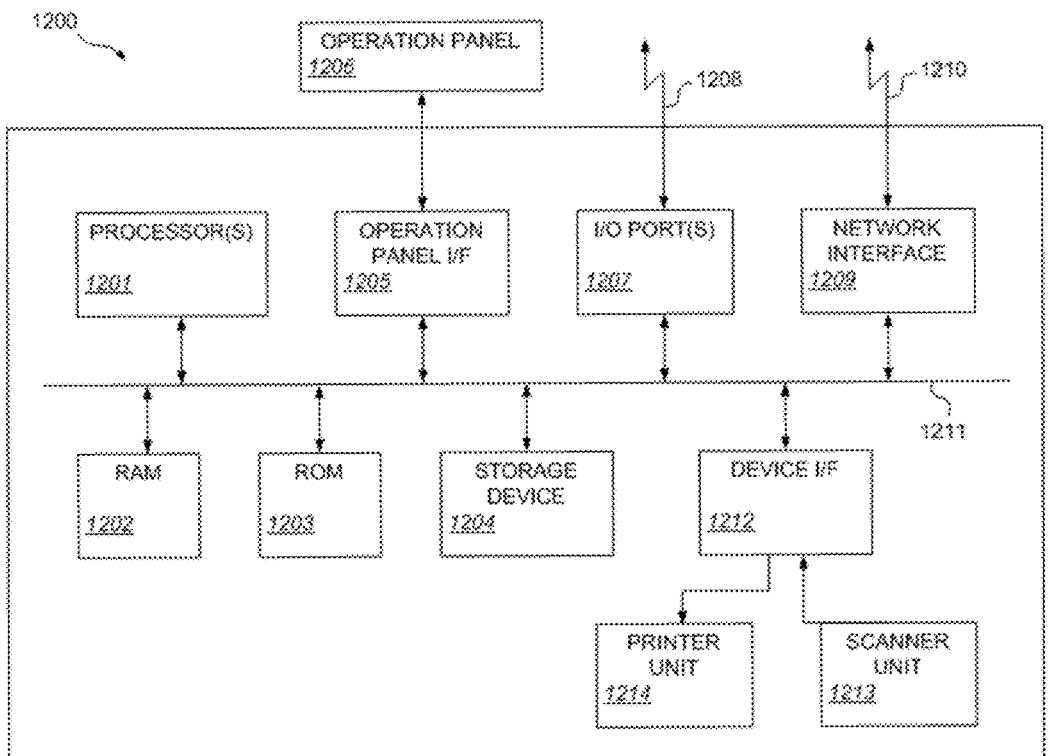
FIG. 12 is a block diagram detailing the components of the image processing device according to invention principles.

FIG. 12 illustrates an example image processing device 1200 that performs various functions including generating electronic data representing a physical document. The image processing device 1200 may be a multifunction peripheral having a scanning function in addition to printing, copying and other functions. However, it will be understood that various other implementations of an image processing device are within the scope of the present invention. For example, various components, modules, functions, and/or configurations of the image processing device 1200 could be combined, deleted, or modified to form further implementations. Further by way of example, in some embodiments, other devices (for example, other devices having scanning capabilities) and/or computing systems (for example, a computer connected to a scanner) may be implemented as the image processing device 1200.

In some embodiments, the image processing device 1200 performs one or more operations described herein. In some embodiments, the image processing device 1200 provides functionality described herein. In some embodiments, software running on the image processing device 1200 performs one or more operations described herein.

The image processing device 1200 includes one or more processor(s) 1201. The processor(s) 1201 include a central processing unit (CPU) that performs overall control functions for the image processing device 1200. The CPU uses a random access memory (RAM) 1202 as a work area while executing instructions. The CPU executes instructions of various programs stored in one or more memory devices. For example, the CPU executes programs stored in a read only memory (ROM) 1203 and in a storage device 1204.

In some embodiments, the processor(s) 1201 include one or more processors in addition to the CPU. By way of example, the processor(s) 1201 may include one or more general-purpose microprocessor(s), application-specific microprocessor(s), and/or special purpose microprocessor(s). Additionally, in some embodiments the processor(s) 1201 may include one or more internal caches for data or instructions.

The processor(s) 1201 provide the processing capability required to execute an operating system, application programs, and various other functions provided on the image processing device 1200. The processor(s) 1201 perform or cause components of the image processing device 1200 to perform various operations and processes described herein, in accordance with instructions stored in one or more memory devices.

The RAM 1202 is used as a work area when the processor(s) 1201 execute various instructions, such as those making up computer programs stored in the ROM 1203 and/or the storage device 1204. The RAM 1202 may be used as a temporary storage area for various data, including input image data. The RAM 1202 may be used as a cache memory. In some embodiments, the RAM may be dynamic RAM (DRAM) or static RAM (SRAM).

The ROM 1203 stores data and programs having computer-executable instructions for execution by the processor(s) 1201. In some embodiments, the ROM 1203 is a boot ROM, storing instructions for the booting process. In some embodiments, the ROM 1203 may be flash memory.

The storage device 1204 stores application data, program modules and other information. One or more program modules stored in the storage device 1204 are configured to cause various operations and processes described herein to be executed. For example, in some embodiments, the storage device 1204 stores instructions for generating and providing to a computing system a web page including an embedded executable program which, when executed on the computing system, is operable to obtain a ticket-granting ticket stored on the computing system and send the ticket-granting ticket to another computing system; determining whether a user associated with the ticket-granting ticket is authorized to access a protected resource comprising a web page; or a combination of these, in accordance with embodiments described herein. In some embodiments, the application 102 resides on the storage device 1204 and executes on the image processing device 1200.

The storage device 1204 also stores other programs and data to be processed. For example, the storage device 1204 stores an operating system including programs and data for managing hardware and software components of the image processing device 1200. Applications on the image processing device 1200 may utilize the operating system to perform various operations. The storage device 1204 may further store other programs and/or drivers that enable various functions of the image processing device 1200, graphical user interface (GUI) functions, and/or processor functions. The storage device 1204 may also store data files including, for example, image data, user data, configuration information, GUI components, such as graphical elements or templates, or other data required by the image processing device 1200.

In some embodiments, the image processing device 1200 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 1200. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

An operation panel interface 1205 provides output signals to and receives input signals from an operation panel 1206. Regarding the output signals, the operation panel interface 1205 provides GUI data to the operation panel 1206 for display on a liquid crystal display (LCD). Regarding the input signals, the operation panel interface 1205 receives input signals based on user input operations at the operation panel 1206 and relays the input signals to the processor(s) 1201. In some embodiments, the operation panel 1206 includes a touch sensitive element operable to receive user input operations or commands based on the touching of graphical objects displayed on the LCD. In some embodiments, the operation panel 1206 includes a hard key panel.

The image processing device 1200 includes one or more input/output (I/O) port(s) 1207. The I/O port(s) 1207 may include any suitable interface type such as a universal serial bus (USB) port, FireWire port (IEEE-1394), serial port, parallel port, or AC/DC power connection port. The I/O port(s) 1207 enable one or more external device(s) 1208 to communicate with the image processing device 1200 when the external device(s) 1208 is/are connected to the I/O port(s) 1207. Examples of external devices 1208 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 1209 includes hardware, software, or both providing one or more interfaces for communication (such as, for example, packet-based communication) between the image processing device 1200 and one or more other computing systems or one or more networks 1210. As an example and not by way of limitation, the network interface 1209 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 1210 and any suitable network interface 1209 for it. As an example and not by way of limitation, the image processing device 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 1210 may be wired or wireless. As an example, the image processing device 1200 may communicate with a wireless PAN (WPAN) (such as, for example, a BLUETOOTH WPAN), a WI-FI network, a WI-MAX network, or other suitable wireless network or a combination of two or more of these. The image processing device 1200 may include any suitable network interface 1209 for any of these networks 1210, where appropriate.

A system bus 1211 interconnects various components of the image processing device 1200 thereby enabling the transmission of data and execution of various processes. The system bus 1211 may include one or more types of bus structures including a memory bus or memory controller, a peripheral bus, and a local bus using any of a variety of bus architectures.

The device interface 1212 is connected to the scanner unit 1213 and to the printer unit 1214. The device interface 1212 performs synchronous/asynchronous conversion of image data.

The scanner unit 1213 includes a light source and an image sensor. The scanner unit 1213 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 1213 includes an optical system (for example, mirrors, lens) that directs the light to the image sensor. After the image sensor generates the electrical signals, an analog-to-digital converter converts the electrical signals to digital image data representing the scanned physical document. The scanner unit 1213 then outputs the digital image data to one or more other components of the image processing device 1200 via the device interface 1212.

The printer unit 1214 is an image output device for printing on a sheet an image corresponding to image data. In response to a print command received at the image processing device 1200, the printer unit 1214 receives image data via the device interface 1212 and outputs to a sheet an image corresponding to the image data.

Various above-described operations performed by client computing systems and/or may be executed and/or controlled by one or more applications running on these system, respectively. The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the above-recited examples may also exist without departing from the scope of the invention.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

What is claimed is:

1. A method of extracting data from an electronic document comprising:

loading, from a memory, a data object representing an electronic document having a plurality of data items each having at least one data value associated therewith;

searching the plurality of data items in the electronic document by keyword search for at least one candidate target data items;

selecting a target data item from the at least one candidate target data items by identifying at least one ancillary data item known to be located within the electronic document proximate to the at least one candidate target data items;

generating a target field within the electronic document to encapsulate the at least one data value associated with the selected target data item, the target field having a predetermined height substantially equal to a height of the target data item, the target field extending horizontally within the electronic document in a direction away from the target data item and extending to a predetermined position in the electronic document;

comparing a format of the at least one data value with a predetermined data value format; and extracting the at least one data value from the target field in response to the format of the at least one data value matching the predetermined data value format for storage in a table of a database.

2. The method according to claim 1, further comprising generating a compound data item field around the candidate data item and the at least one ancillary data item;

comparing a format of the compound data item field with a predetermined format; and selecting, as the target data item, the candidate target data item when the format of the compound data item field matches the predetermined format.

3. The method according to claim 1, further comprising in response to identifying a plurality of candidate data items, generating a data field around each of the candidate data items;

extending the data field to form a compound data item field in a direction away from each candidate data item to identify the at least one ancillary data item; and selecting, as the target data item, the candidate data item within the compound data item field including a predetermined first ancillary data item within a predetermined distance from the respective candidate data item.

4. The method according to claim 3, wherein in response to determining that more than one candidate data item is within a predetermined distance to the first ancillary data item, extending the compound data item field further in one of a same direction or different direction to identify at least one further ancillary data item within a predetermined distance from each of the candidate data item and the first ancillary data item; and selecting, as the target data item, the candidate data item from within the compound data item field that is a predetermined distance from each of the first ancillary data item and at least one further ancillary data item.

5. The method according to claim 1, wherein the step of generating a target field further comprises creating the target field having a predetermined height substantially equal to a height of the target data item, the target field beginning at a position in the electronic document a predetermined distance from a margin thereof and aligned with the selected target data item, the target field begin sequentially extending horizontally within the electronic document in a direction towards the target data item.

6. The method according to claim 1, further comprising receiving electronic document data; and performing an optical character recognition process on the electronic document data to create the data object.

7. A server apparatus that extracts data from an electronic document, the server comprising:

a controller;

a memory coupled to the controller storing instructions that, when executed by the controller control the server to load, from a memory, a data object representing an electronic document having a plurality of data items each having at least one data value associated therewith;

search the plurality of data items in the electronic document by keyword search for at least one candidate target data items;

select a target data item from the at least one candidate target data items by identifying at least one ancillary data item known to be located within the electronic document proximate to the at least one candidate target data items;

generate a target field within the electronic document to encapsulate the at least one data value associated with the selected target data item, the target field having a predetermined height substantially equal to a height of the target data item, the target field extending horizontally within the electronic document in a direction away from the target data item and extending to a predetermined position in the electronic document;

compare a format of the at least one data value with a predetermined data value format; and extract the at least one data value from the target field in response to the format of the at least one data value matching the predetermined data value format for storage in a table of a database.

8. The server apparatus according to claim 7, wherein execution of the instructions causes the server apparatus to generate a compound data item field around the candidate target data item and the at least one ancillary data item;

compare a format of the compound data item field with a predetermined format; and select, as the target data item, the candidate data item when the format of the compound data item field matches the predetermined format.

9. The server apparatus according to claim 7, wherein execution of the instructions causes the server apparatus to in response to identifying a plurality of candidate data items, generate a data field around each of the candidate data items;

extend the data field to form a compound data item field in a direction away from each candidate data item to identify the at least one ancillary data item; and select, as the target data item, the candidate data item within the compound data item field including a predetermined first ancillary data item within a predetermined distance from the respective candidate data item.

10. The server apparatus according to claim 9, wherein execution of the instructions causes the server apparatus to in response to determining that more than one candidate data item is within a predetermined distance to the first ancillary data item, extend the compound data item field further in one of a same direction or different direction to identify at least one further ancillary data item within a predetermined distance from each of the candidate data item and the first ancillary data item; and select, as the target data item, the candidate data item from within the compound data item field that is a predetermined distance from each of the first ancillary data item and at least one further ancillary data item.

11. The server apparatus according to claim 9, wherein execution of the instructions causes the server apparatus to receive electronic document data; and perform an optical character recognition process on the electronic document data to create the data object.

12. The server apparatus according to claim 7, wherein generation of the a target field further includes creating the target field having a predetermined height substantially equal to a height of the target data item, the target field beginning at a position in the electronic document a predetermined distance from a margin thereof and aligned with the selected target data item, the target field begin sequentially extending horizontally within the electronic document in a direction towards the target data item.

* * * * *